United States Patent Office 3,637,760
Patented Jan. 25, 1972

3,637,760
COMPOUNDS OF FIVE AND SIX-MEMBERED CYCLIC ALPHA, BETA-UNSATURATED ETHERS
Rostyslaw Dowbenko, Gibsonia, Pa., assignor to PPG Industries, Inc., Pittsburgh, Pa.
No Drawing. Continuation-in-part of application Ser. No. 671,990, Oct. 2, 1967. This application Jan. 19, 1970, Ser. No. 4,120
Int. Cl. C07d 7/04, 5/02
U.S. Cl. 260—345.8       7 Claims

ABSTRACT OF THE DISCLOSURE

Compounds containing 2-tetrahydropyranyloxy groups or 2-tetrahydrofuranyloxy groups are formed by reacting carboxylic acid esters containing hydroxyl groups with 2,3-dihydropyran or 2,3-dihydrofuran. Preferred embodiments include 2-(2-tetrahydropyranyloxy)ethyl acrylate, 2-(2-tetrahydropyranyloxy)ethyl methacrylate, and butyl 2-(2-tetrahydropyranyloxy)ethyl fumarate. Homopolymers and interpolymers of the 2-tetrahydropyranyloxy and 2-tetrahydrofuranyloxy compounds with other ethylenic monomers are useful as films and coatings which cure very rapidly at low temperatures and are solvent resistant.

This application is a continuation-in-part of our copending application Ser. No. 671,990, filed Oct. 2, 1967 and now abandoned.

Polymers of ethylenically unsaturated compounds have been used extensively in thermosetting coating compositions. Various properties are obtained according to the choice of polymers used. The coatings can range from soft flexible materials to very hard materials.

While the above-described polymers are outstandingly successful for many applications, the baking operations involved in converting them to the thermoset state ordinarily require very high temperatures for a long period of time which impose certain limitations on the use of these materials. For example, many industries do not have baking faciilties of sufficient flexibility to cure films at temperatures substantially above 300° F.

The addition of methanol to 2,3-dihydropyran to form 2-methoxytetrahydropyran is known in the prior art (G. F. Woods and D. N. Kramer, Journal of the American Chemical Society, volume 69, page 2246, 1947). However, it has now been discovered that the addition of an unsaturated carboxylic acid ester containing pendant hydroxyl groups to 2,3-dihydropyran or 2,3-dihydrofuran will form an ether that may be homopolymerized to form fast curing thermosetting resins and may be interpolymerized with the above vinyl resins to provide compositions which can be cured to a hard, solvent-resistant, thermoset state within a relatively short time and often at reduced temperatures. Some of these resins cure at temperatures which render them suitable even for application to wood or other materials which do not successfully withstand high temperature baking, and they are particularly useful for application in those industries where present equipment limitations impose maximum film baking temperatures.

The novel ethers of this invention, containing 2-tetrahydropyranyloxy groups or 2-tetrahydrofuranyloxy groups, are formed by reacting a five or six-membered cyclic alpha, beta-unsaturated ether selected from the group consisting of 2,3-dihydropyran and 2,3-dihydrofuran with an unsaturated carboxylic acid ester containing pendant hydroxyl groups in an acidic medium. The reaction is an addition reaction to the 2,3-dihydropyran or 2,3-dihydrofuran.

The hydroxyl-containing esters can be any polymerizable alpha, beta-ethylenically unsaturated carboxylic acid ester containing pendant hydroxyl groups. The ester may be prepared from mono-, di-, or tri-carboxylic acids containing from about 2 to about 18 carbon atoms per molecule. The hydroxyl groups may be in any position so long as they are pendant to the ester and there may be a plurality of hydroxyl groups present. The use of primary or secondary hydroxyl groups, however, is preferred.

Some examples of the unsaturated carboxylic acid esters containing pendant hydroxyl groups are hydroxyalkyl esters of acrylic and methacrylic acid, such as hydroxyalkyl methacrylates and acrylates. Examples of these are 2-hydroxyethyl methacrylate, 2-hydroxypropyl methacrylate, 2-hydroxyoctyl methacrylate; and hydroxyalkyl acrylates such as 2-hydroxyethyl acrylate, 2-hydroxypropyl acrylate, 2-hydroxydecyl acrylate, 3-hydroxypropyl acrylate, 4-hydroxybutyl acrylate, 5-hydroxypentyl acrylate, neopentyl glycol monoacrylate, and the like. Some other examples of unsaturated carboxylic acid esters containing pendant hydroxyl groups are di- and tri-acrylates and methacrylates such as 1,3-glycerol diacrylate, 1,3-glycerol dimethacrylate, pentaerythritol triacrylate, trimethylol propane diacrylate, and the like, hydroxyalkyl fumarates and bis-hydroxyalkyl fumarates, such as butyl 2-hydroxyethyl fumarate, isopropyl 2-hydroxybutyl fumarate, and bis-2-hydroxyethyl fumarate; hydroxyalkyl crotonates, such as 2-hydroxyethyl crotonate, 2-hydroxypropyl crotonate and 2-hydroxyoctyl crotonate; and alkyl hydroxyalkyl maleates and bis-hydroxyalkyl maleates, such as ethyl 2-hydroxybutyl maleate, isopropyl 2-hydroxyethyl maleate and bis-2-hydroxybutyl maleate and the like.

The addition is carried out in an acid medium. Generally, a small amount of an acidic compound is added to the reactants. The particular acidic compound used is not important as any acidic compound will catalyze the reaction.

Some examples of acidic compounds that may be used are mineral acids such as hydrochloric acid, phosphoric acid and sulfuric acid; carboxylic acids such as trifluoroacetic acid and acrylic acid; Lewis acids such as boron trifluoride and aluminum trichloride; sulfonic acids such as ethanesulfonic acid and benzenesulfonic acid; fatty acids such as propionic acid and butyric acid, and others.

The proportion of the unsaturated carboxylic acid ester with pendant hydroxyl groups and the five or six-membered cyclic alpha, beta-unsaturated ether used in the reaction is not critical. Generally, it is preferred to use an excess of the five or six-membered cyclic alpha, beta-unsaturated ether such as 1.1 mole of the ether to 1 mole of the carboxylic acid ester with hydroxyl groups. This ordinarily produces 100 percent conversion of the ester to the new compounds of this invention.

Only a trace amount of acidic compound is needed to carry out the reaction. The acid is washed out after the reaction with a basic solution, such as sodium hydroxide or sodium bicarbonate, and the resulting product can be distilled if desired.

The reaction is carried out at room temperature for as long as there remains unreacted carboxylic acid ester with hydroxyl groups. Generally, the reaction may be carried out from 1 to 7 hours.

It has also been found that hydroxy-containing polymers, such as phenoxy resins containing pendant hydroxyl groups when modified with 2,3-dihydropyran or 2,3-dihydrofuran, will show improved solvent resistance.

The reaction between a phenoxy polymer and the 2,3-dihydropyran or 2,3-dihydrofuran can be carried out at about 50° C. for 6 hours, using from about 10 to about 30 weight percent of the 2,3-dihydropyran or 2,3-dihydrofuran. Generally a solvent, such as tetrahydrofuran, is used.

The polymers of the novel ethers produced by the method described above are useful as coatings and films and have excellent solvent resistance, gloss and adhesive properties. The ethers can be polymerized in a number of ways, such as bulk polymerization, or by heating the monomer in the presence of a free-radical initiator such as azobis-(isobutyronitrile) or benzoyl peroxide. Generally, the same method can be used to homopolymerize the compounds or form interpolymers containing the novel ethers.

Although the homopolymers of the novel ethers have been found to have excellent solvent resistance and other desirable properties, in the preferred embodiment of the invention, the novel ethers are interpolymerized with other ethylenic monomers to form thermosetting resins for use as protective coatings and films.

Any polymerizable monomeric compound containing at least one $CH_2=C<$ group may be polymerized with the novel ether. Examples of such monomers include the following:

Monoolefinic and diolefinic hydrocarbons, such as styrene, alpha-alkyl styrene, vinyl toluene, isobutylene, ethylene, propylene, butylene, isoprene and the like;

Halogenated monoolefinic and diolefinic hydrocarbons, such as alpha-fluorostyrene, 2,5-dibromostyrene, 2-chloropropene, 1,2-dichloroethylene, 1,1-dichloroethylene, chlorobutadiene and other halogenated diolefinic compounds;

Esters of organic and inorganic acids, such as vinyl propionate, vinyl methoxybenzoate, methyl methacrylate, ethyl methacrylate, propyl methacrylate, butyl methacrylate, hexyl methacrylate, octyl methacrylate, decyl methacrylate, lauryl methacrylate, 2-hydroxyethyl methacrylate, methyl crotonate, ethyl tiglate, methyl acrylate, ethyl acrylate, propyl acrylate, isopropyl acrylate, butyl acrylate, hexyl acrylate, 2-ethylhexyl acrylate, decyl acrylate, dodecyl acrylate, 2-hydroxyethyl acrylate, isoprenyl acetate, 3-hydroxypropyl acrylate, vinyl alpha-chloroacetate, allyl chloride, allyl acetate, beta-ethyl allyl chloride, methyl alpha-chloroacrylate, and dimethyl maleate;

Organic nitriles, such as acrylonitrile, methacrylonitrile, ethacrylonitrile, and the like;

Acid monomers, such as acrylic acid, methacrylic acid, crotonic acid, 3-butenoic acid, angelic acid, tiglic acid, methyl hydrogen maleate, butyl hydrogen fumarate, and the like.

It is to be understood that the above-polymerizable olefinic monomers are representative only and do not include all of the $CH_2=C<$ containing monomers which may be employed.

In carrying out the polymerization reaction, a free radical-initiating type catalyst, particularly, a peroxygen compound, is ordinarily utilized. The most useful compound found is azobis(isobutyronitrile). Other useful catalysts for this purpose include acetyl peroxide, hydroxyheptyl peroxide, methyl ethyl ketone peroxide, 2,4-dichlorobenzoyl peroxide, cumene hydroperoxide, t-butyl hydroperoxide, methyl amyl ketone peroxide, benzoyl peroxide, p-chlorobenzoyl peroxide, peracetic acid, t-butyl permaleic, t-butyl peracetate and the like. In some polymerization reactions, mixtures of the above peroxygen compounds are used to secure desired conversions.

The quantity of catalyst employed can vary considerably. However, in most instances, it is most desirable to utilize from about 0.1 percent to 3 percent. If high viscosities are desired, a low initial level of catalyst followed by the necessary additions to get 100 percent conversion is preferably employed. For low viscosity interpolymers, the bulk of the catalyst is added initially and later additions used only to secure desired conversions. Larger amounts of catalyst added initially give lower viscosities.

Since it is desirable that the interpolymers of the novel ethers of this invention with other ethylenically unsaturated monomers be relatively low in molecular weight so that they can be dissolved at high solids and low viscosity, of chain-modifying agent or chain-terminator may be added to the polymerization mixture. The mercaptans, such as dodecyl mercaptan, tertiary dodecyl mercaptan, octyl mercaptan, hexyl mercaptan and the like, are conventionally used for this purpose, although other chain-modifying agents such as cyclopentadiene, alpha-methyl styrene, and the like can also be used to secure low molecular weights.

The polymerization is best carried out by admixing the novel ether and the other monomer or monomers, the catalysts and the chain-modifying agent, if any, in a solvent and refluxing the resulting solution for a time sufficient to obtain the desired conversion. Ordinarily, the polymerization will be complete in about 1 to 16 hours.

Homopolymers containing 2 - tetrahydropyranyloxy groups and 2-tetrahydrofuranyloxy groups and interpolymers thereof with other vinyl monomers are film-forming and can be used as protective coatings and for similar purposes in which such characteristics are desired. The polymers produce flexible films which have excellent mar resistance, solvent resistance and other desirable properties.

Both the homopolymers and the interpolymers described above also have desirable adhesive qualities which make them useful as bonding agents and adhesives.

The polymers can be coated onto many substrates, such as metal, wood, glass, etc., to protect the surface face and are also useful as films and in laminates.

The novel ethers and polymers containing them represent a novel tool in imparting cross-linking to polymers made from conventional monomers so that the resulting polymers cure more easily and form solvent-resistant films. The novel ethers themselves can also be mixed with conventional polymers to promote a faster and more complete curing of the those polymers.

It has been found that the curing of the interpolymers described above is faster and may be effected at a lower temperature if one or more of the monomers in the interpolymer contains hydroxyl groups or acidic groups, such as hydroxyethyl methacrylate or acrylic acid. Acids can also be added externally to aid the curing of both the homopolymers and interpolymers of the novel ethers. Mixtures of the ethers of the invention and other polymers, homopolymers of the ether, and interpolymers of the ether with other polymers also cure faster and at lower temperatures in the presence of acidic additives, such as p-toluene, sulfonic acid, butyl hydrogen maleate and butyl phosphate.

Useful interpolymers for certain purposes are obtained with even very low amounts of the novel ether in the interpolymer, for example, as low as 1 percent or even lower. The preferred interpolymers, however, contain from about 5 to about 20 percent by weight of the novel ether so that the interpolymer will have the best thermosetting properties and will have enough of the ether to impart the desired curing properties to the interpolymer.

Pigments such as titanium dioxide, carbon black, and the like may be added to the coating compositions to form any desired color. Other ingredients normally found in coating compositions, such as germicides, fillers, driers, silicones, and the like, may also be added.

The present invention is more particularly described in the following examples which are intended as illustrative only since numerous modifications and variations therein will be apparent to those skilled in the art. It is to be understood that unless otherwise indicated all percentages are by weight and are based upon non-volatile solids content.

EXAMPLE 1

This example illustrates the preparation of 2-(2-tetrahydropyranyloxy) ethyl acrylate. This ether was prepared by the method described below.

A reaction vessel was charged with 232.4 parts (2 moles) of hydroxyethyl acrylate, 1 part of hydroquinone and 0.5 part of 35 percent aqueous hydrochloric acid solution. One hundred eighty-five (185) parts (2.20 moles) of 2,3-dihydropyran was added dropwise over a period of one-half (½) hour while the temperature was kept below 50° C. The reaction mixture was then treated with 10 parts of sodium bicarbonate in 100 parts of water. The mixture was then thoroughly shaken and separated and filtered. The filtrate was evaporated. The resulting product was 345 parts of 2-(2-tetrahydropyranyloxy) ethyl acrylate which had a refractive index of $n_D^{25}$ 1.4602.

EXAMPLE 2

In this example, 2-(2-tetrahydropyranyloxy)ethyl methacrylate was prepared by the method described below.

A recation vessel was charged with 130.2 parts (1.00 mole) of hydroxyethyl methacrylate, 1 part of hydroquinone and 0.25 part of 35 percent aqueous hydrochloric acid solution. Ninety-two and one-half (92.5) parts (1.1 mole) of 2,3-dihydropyan was added and the mixture was stirred. The temperature was kept below 50° C. by occasional cooling. The reaction was run at room temperature for 2½ hours. The extent of the reaction was checked by gas chromatography, and it was found that only 5 percent of unreacted hydroxyethyl methacrylate remained. Five parts of solid sodium bicarbonate in 50 parts of water was then added to the mixture, and the mixture was stirred and separated. The mixture was filtered and the filtrate was distilled after the addition of 0.5 part of hydroquinone. The resulting product was 87 parts of 2-(2-tetrahydropyranyloxy)ethyl methacrylate which had a refractive index of $n_D^{25}$ 1.4573 and a boiling point range of 73° to 78° C. at 0.05 mm. Hg.

EXAMPLE 3

Butyl 2-(2-tetrahydropyranyloxy)ethyl fumarate was prepared by the method described below.

A reaction vessel was charged with 216 parts (1.0 mole) of butyl hydroxyethyl fumarate and 0.5 part of 35 percent aqueous hydrochloric acid solution. Eighty-four (84) parts (1.0 mole) of 2,3-dihydropyran was added dropwise over a period of ½ hour. The temperature was kept below 50° C. by occasional cooling. The mixture was stirred at room temperature for 3 hours and then treated with 25 parts of sodium bicarbonate in 150 parts of water. The mixture was shaken, separated and filtered. The filtrate was evaporated to give 243 parts of butyl 2-(2-tetrahydropyranyloxy)ethyl fumarate which had a refractive index of $n_D^{25}$ 1.4651.

EXAMPLE 4

A reaction vessel was charged with 810 grams of 1,4-butanediol, 24.9 grams of sulfuric acid, 2.5 grams of hydroquinone, and 50 grams of cyclohexane. The reactants were heated to 95° C., 15 cubic centimeters of cyclohexane were added and 324.3 grams of acrylic acid were added incrementally over a 40-minute period. The reaction was run at 94° C. for a total of 2½ hours during which time an additional 80 grams of cyclohexane had been added. The product was washed and the solvent distilled. The resulting product was 1,4-butanediol monoacrylate.

A novel ether was formed by charging a reactor with 144.1 grams of the above prepared ester, 0.5 gram of hydroquinone, and 0.5 cubic centimeter of hydrochloric acid solution, 92.05 grams of dihydropyran were added incrementally over a period of 30 minutes at which time the reactants were maintained at a temperature of 50° C. The product was neutralized by stirring with sodium bicarbonate and filtered and the filtrate was evaporated to give 199 grams of tetrahydro-2-pyranyl ether of 1,4-butanediol monoacrylate.

EXAMPLE 5

A reaction vessel was charged with 294.2 grams of maleic anhydride and 612 grams of hydroxypivalyl hydroxypivalate having the formula

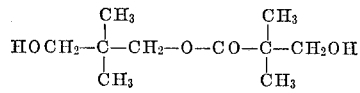

The reactants were heated to 100° C. for 2 hours and 50 minutes at which time 296.5 grams of butanol and 12.1 grams of sulfuric acid were added and the reactants were heated to 120° C. for an additional 2½ hours. During the reaction, 170 cubic centimeters of toluene and 120 cubic centimeters of cyclohexane were added at various times. The solution was distilled off.

A novel ether was prepared by charging a reactor with 279 grams of the above prepared ester and 277.5 grams of dihydropyran and heating at 50° C. for 1 hour. The product was stirred and filtered and the filtrate was evaporated to give 1160 grams of tetrahydro-2-pyranyl ether of butyl 3-hydroxy-2,2-dimethyl-1-propyl maleate.

EXAMPLE 6

This example illustrates the improved properties of a polymer of a phenoxy resin with pendant hydroxyl groups when modified with 2,3-dihydropyran.

A reaction vessel was charged with 100 parts of a polymer of a phenoxy resin made from the condensation reaction of equimolar amounts of 4,4'-isopropylidene diphenol and epichlorohydrin terminated with phenol, having a molecular weight of greater than 10,000, a specific gravity of 1.18, a softening temperature of 212° F., and an ultimate tensile strength of 9,500 (made by Union Carbide Corporation), and 100 parts of tetrahydrofuran solvent and heated at 67° C. for 3 hours. 0.5 part of 35 percent hydrochloric acid solution was added and 20 parts of 2,3-dihydropyran was added dropwise through a funnel. The temperature of the mixture was raised to 50° C. and run at that temperature for 6 hours.

A film of the above-modified phenoxy resin polymer was drawn down on a steel panel and baked at 350° F. for 30 minutes. The coating was found to be insoluble to xylene according to the xylene rub test (rubbing the coating with a cloth saturated with xylene for 40 rubs and noting the surface condition of the coating thereafter), and not soluble in tetrahydrofuran using the same test with a cloth saturated with tetrahydrofuran, and not soluble in acetone using a test with a cloth saturated with acetone.

In comparison with the above results, a film of the same phenoxy resin polymer, unmodified, was drawn down on a steel plate and subjected to the rub tests. This unmodified coating was found to be insoluble in xylene, but completely soluble in tetrahydrofuran and completely soluble in acetone. It is thus seen that the addition of dihydropyran to a phenoxy resin polymer will give the phenoxy polymer improved solvent resistance.

EXAMPLE 7

This example illustrates the homopolymerization of the novel ethers of this invention and the improved curing characteristics obtained by a polymer when mixed with the ether. A homopolymer of 2-(2-tetrahydropyranyloxy) ethyl methacrylate was prepared by the method set forth below.

A vessel was charged with 50 parts of a monomer of 2-(2-tetrahydropyranyloxy)ethyl methacrylate and 75 parts of toluene. One and three-quarters (1¾) parts of azobis(isobutyronitrile) was added and the mixture was heated at 85° C. for 15 hours. The resulting product was a homopolymer of 2-(2-tetrahydropyranyloxy)ethyl methacrylate.

A film was prepared from 5.0 parts of the homopolymer and 10.0 parts of a polymer containing 95 percent methyl methacrylate and 5 percent hydroxyethyl methacrylate. On baking at 350° F. for ½ hour, the film was partially cross-linked and was only slightly affected by rubbing with a cloth saturated with xylene 40 rubs. In contrast, a film prepared and baked in a similar manner from 15 parts of a copolymer of 95 percent methyl methacrylate and 5 percent hydroxyethyl acrylate was not cross-linked and was destroyed by rubbing with a cloth saturated with xylene. This indicates the value of the novel ether when added to an interpolymer such as the methyl methacrylate and hydroxyethyl acrylate polymer as an additive to aid the curing characteristics of the interpolymer.

A film was prepared from 5.0 parts of the homopolymer and 5.0 parts of a polymer containing 30 percent 2-ethylhexyl acrylate, 30 percent styrene, 12 percent butyl methacrylate, 18 percent methyl methacrylate, 4 percent 2-hydroxyethyl methacrylate, 2 percent methacrylic acid, and 4 percent 2-hydroxypropyl methacrylate. After being heated at 350° F. for ½ hour, the curing of the film was tested by rubbing with a cloth saturated with xylene 40 times. The film showed only partial curing. A second film was prepared from the same mixture using 0.2 part of p-toluene sulfonic acid as an additive, and this film was baked for ½ hour at 325° F. This film was completely cured, which illustrates the use of acids as curing additives.

EXAMPLE 8

This example illustrates the interpolymerization of the novel ether with other ethylenic monomers and the improved curing characteristics obtained therefrom.

An interpolymer was prepared by adding 20 parts of 2-(2-tetrahydropyranyloxy)ethyl methacrylate, 10 parts of 2-hydroxyethyl methacrylate, 35 parts of ethyl acrylate, 35 parts of methyl methacrylate, 1 part of benzoyl peroxide and 0.2 part of t-dodecyl mercaptan to 100 parts of xylene at 85° C. over a period of 6 hours. The mixture was heated at 85° C. for a total of 10 hours. The resulting interpolymer had a solids content of 46.8 percent and a Gardner-Holdt viscosity of Y.

A similar interpolymer, but without the tetrahydropyranyloxy monomer, was prepared in the same manner from 12.5 parts of hydroxyethyl methacrylate, 43.75 parts of ethyl acrylate, 43.75 parts of methyl methacrylate, 1 part of benzoyl peroxide and 0.2 part of t-dodecyl mercaptan in 100 parts of xylene. The resulting interpolymer had a solids content of 49.8 percent and a Gardner-Holdt viscosity of Z.

Films were prepared from each of the interpolymers above and were baked at 325° F. for ½ hour. The film which did not contain the novel ether of the tetrahydropyranyloxy monomer was soluble in xylene, but the film containing the novel ether was insoluble in xylene. This indicates the use of the ether as a tool for imparting valuable curing properties to the interpolymer. The films had comparable mar resistance.

EXAMPLE 9

An interpolymer consisting of 20 parts of 2-(2-tetrahydropyranyloxy)ethyl methacrylate, 35 parts of methyl methacrylate, 25 parts of ethyl acrylate, 10 parts of 2-hydroxyethyl methacrylate, 5 parts of acrylic acid and 5 parts of 2-ethylhexyl acrylate was prepared using the method of Example 8. A film was prepared of this interpolymer.

Interpolymers were prepared without the 2-(2-tetrahydropyranyloxy)ethyl methacrylate to compare for curing properties. To effect the comparison, one interpolymer was formed from 10 parts of acrylamide, 2.5 parts of methacrylic acid and 87.5 parts of styrene, and another interpolymer was prepared from 10 parts of acrylamide, 2.5 parts of methacrylic acid, 43.5 parts of styrene and 44 parts of ethyl acrylate.

Films of the interpolymers were baked at 325° F. for 30 minutes and rubbed 40 times with a cloth saturated with xylene to test for curing. The interpolymer containing the 2 - (2 - tetrahydropyranyloxy)ethyl methacrylate was not affected by the rubbing test, which indicated that it was cured. The interpolymers that did not contain the 2-(2-tetrahydropyranyloxy)ethyl methacrylate were visibly damaged by the rub test.

It is seen that the addition of the novel ether to the interpolymer has a significant effect on the solvent resistance and curing properties of the interpolymer.

EXAMPLES 10 TO 22

Some of the novel ethers of this invention were interpolymerized with several other ethylenic monomers and the results are tabulated below.

The general procedure for preparing the interpolymers was to mix the monomers, the initiator [azobis-(isobutyronitrile) or benzoyl peroxide] and t-dodecyl mercaptan, and add the mixture dropwise over a period of 2 to 4 hours to the mixture of solvents (usually xylene containing from 10 to 25 percent butanol or dioxane). The mixture was heated to a temperature of from 80° C. to 90° C. An additional portion of the initiator dissolved in xylene was added dropwise and the polymerization mixture was heated for a total of 6 to 8 hours.

In order to test the extent of the curing, the films of the interpolymer solutions were laid down on steel panels and were baked at 325° F. for 30 minutes. The film was considered cured if its surface was nearly unchanged after rubbing (40 passes) with a cloth saturated with xylene. All of the films in the present examples were cured. The data are shown in the table below using the following abbreviations.

Explanation of abbreviations in Table I

THPMA—2-(2-tetrahydropyranyloxy)ethyl methacrylate
THPA—2-(2-tetrahydropyranyloxy)ethyl acrylate
MMA—Methyl methacrylate
EA—Ethyl acrylate
HEMA—2-hydroxyethyl methacrylate
AA—Acrylic acid
BHEF—Butyl hydroxyethyl fumarate
EHA—2-ethylhexyl acrylate
AAM—Acrylamide
STY—Styrene
BMA—Butyl methacrylate

TABLE I

| Example | Percent monomers | | | | | | | | | | | Percent solids | Gardner viscosity |
|---|---|---|---|---|---|---|---|---|---|---|---|---|---|
| | THPMA | THPA | MMA | EA | HEMA | AA | BHEF | EHA | AAM | STY | BMA | | |
| 10 | 20 | | 45 | 15 | | | 20 | | | | | 46.3 | I |
| 11 | 20 | | 50 | 25 | | | | 5 | | | | 51.2 | $Z_4$ |
| 12 | 20 | | 30 | 15 | | 3 | 15 | | | | 17 | 48.8 | S |
| 13 | 20 | | 50 | 15 | 5 | | | | | | 10 | 46.4 | U |
| 14 | 20 | | 35 | 12 | 10 | 3 | | 10 | | | 10 | 49.7 | $Z^2$ |
| 15 | 20 | | 35 | 12 | 10 | 3 | | 15 | | | 15 | 50.3 | Z |
| 16 | 20 | | 30 | 32 | 10 | 3 | | 5 | | | | 48.5 | U |
| 17 | 20 | | 25 | 32 | 10 | 3 | | 10 | | | | 49.3 | W |
| 18 | 20 | | 10 | | 10 | 5 | | 10 | | 35 | 10 | 42.5 | I |
| 19 | 20 | | 35 | 27 | 10 | 3 | | 5 | | | | 49.2 | X |
| 20 | 20 | | 35 | 27 | 10 | 3 | | 5 | | | | 48.0 | U |
| 21 | 5 | | 60 | 30 | | | | | 5 | | | | I |
| 22 | | 20 | 20 | | 10 | 5 | | | | 35 | 10 | 46.9 | Q |

While there are above described a number of specific embodiments of the present invention, it is obviously possible to produce other embodiments and various equivalent modifications thereof without departing from the spirit of the invention or the scope of the appended claims.

What is claimed is:

1. An ether of (1) a polymerizable alpha, beta-ethylenically unsaturated carboxylic acid ester containing pendant hydroxy groups in the alcohol moiety wherein the carboxylic acid contains from 2 to 15 carbon atoms and (2) a cyclic alpha, beta-unsaturated ether selected from the group consisting of 2,3-dihydropyran and 2,3-dihydrofuran.

2. The ether of claim 1 wherein the cyclic alpha, beta-unsaturated ether is 2,3-dihydropyran.

3. The ether of claim 2 wherein the ester is 2-hydroxyethyl methacrylate.

4. The ether of claim 1 wherein the ester is a hydroxyalkyl ester of a member of the group consisting of acrylic and methacrylic acid.

5. The ether of claim 4 wherein the ester is 2-hydroxyethyl methacrylate.

6. The ether of claim 4 wherein the ester is 2-hydroxyethyl acrylate.

7. The ether of claim 1 wherein the ester is an alkyl hydroxyalkyl fumarate.

References Cited

UNITED STATES PATENTS 2,877,208   3/1959   Lal _____ 260—345.8 X

NORMA S. MILESTONE, Primary Examiner

U.S. Cl. X.R.

260—47 EP, 861, 75 U, 347.4